June 20, 1961 J. F. BYRNE 2,989,623

PREASSEMBLED INTERCONNECTING MODULE CIRCUIT

Filed Dec. 23, 1957 3 Sheets-Sheet 1

INVENTOR.
John F. Byrne,
BY
Mueller & Aichele
Att'ys.

PREASSEMBLED INTERCONNECTING MODULE CIRCUIT

Filed Dec. 23, 1957 3 Sheets-Sheet 2

INVENTOR.
John F. Byrne,
BY
Mueller & Aichele
Att'ys.

PREASSEMBLED INTERCONNECTING MODULE CIRCUIT

Filed Dec. 23, 1957 3 Sheets-Sheet 3

INVENTOR.
John F. Byrne,
BY Mueller & Aichele
Atty's.

United States Patent Office 2,989,623

Patented June 20, 1961

2,989,623

PREASSEMBLED INTERCONNECTING MODULE CIRCUIT

John F. Byrne, Riverside, Calif., assignor to Motorola, Inc., Chicago, Ill., a corporation of Illinois Filed Dec. 23, 1957, Ser. No. 704,595

16 Claims. (Cl. 250—14)

This invention relates generally to electronic units and more particularly to amplifiers and other electronic units which are constructed as standard preassembled easily interconnected modules, so that a plurality of units can be used together to form a complete piece of equipment.

In the manufacture of electronic equipment, certain units have been standardized but, in general, when a new equipment is designed, the amplifiers, detectors, and other circuit stages are specially designed for the particular equipment being manufactured. Vacuum tubes have been standardized to the point that designers will, in most cases, pick an existing tube rather than design a special tube which might be specially suited for an individual job. Other electrical items such as relays and motors have been standardized and equipment designers will specify a standard item rather than develop a new item.

It is believed, however, that many other units can be built as standard modules with fixed characteristics which can be selected by the designers when such a unit is required. For example, amplifiers can be built for use at various frequencies and which provide definite characteristics such as bandpass, gain, and operating voltage, so that a standard amplifier unit can be used in many different equipments which may be used for entirely different purposes. Similarly, detectors or demodulators can be built which are of such general application that they may be used in relatively widely differing equipments. Precision bandpass control may readily be obtained through the use of passive filter networks which may be conveniently inserted at any point in the amplifier cascade. It is believed that the use of a standardized unit having proven characteristics will, in general, be better and less expensive than to design a new unit which must be brought to the desired level of quality and reliability and produced at a reasonable cost.

It is, therefore, an object of the present invention to simplify and improve the design and manufacture of electric equipment by the use of a new pre-constructed module.

It is a further object of this invention to provide a novel module construction for an electric unit.

It is another object of the invention to provide a preassembled module which can be easily cascaded mechanically and electrically with other modules for use in electronic equipment or systems.

A still further object of the invention is to provide electronic equipment units as modules which can be pre-built, tested, and sealed to be available for use with the characteristics being known and fixed.

A feature of this invention is the provision of a method of constructing electric equipment whereby units of the equipment are preassembled and units having the required characteristics are interconnected to form a complete piece of equipment.

A further feature of this invention is the provision of a stage or functional element of an electric equipment which is constructed as a unit with a housing which completely seals the unit electrically and mechanically, and which may be easily interconnected with other units.

Another feature of the invention is the provision of an electronic stage, such as an amplifier, constructed in a cylindrical conducting housing which is threaded or otherwise formed for quick mechanical connection to other housings, and with electrical connections being made between the stages through the housing and one or more other conductors brought into engagement when the housings are mechanically assembled.

Still another feature of the invention is the provision of an electronic module which includes a transistor and other electronic components completely sealed in a housing which electrically and mechanically protects the module, and includes provisions for electrically and mechanically interconnecting each module to other modules.

The invention is illustrated in the drawings wherein.

Figure 12:
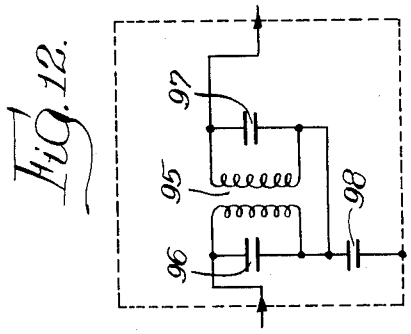
Figure 9:
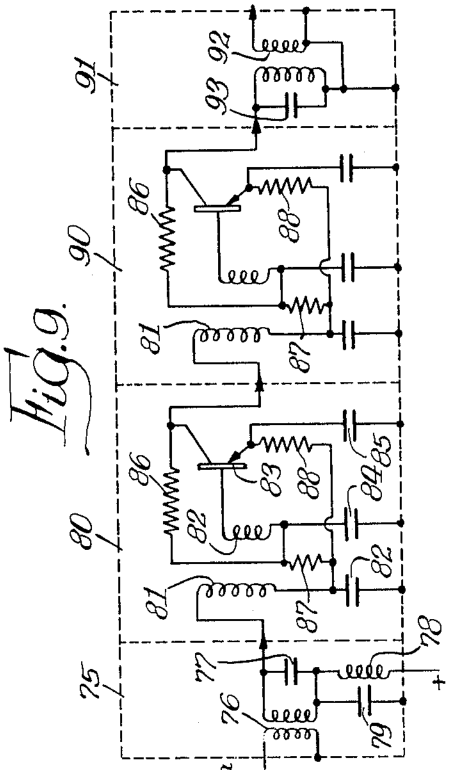
Figures 15, 16:
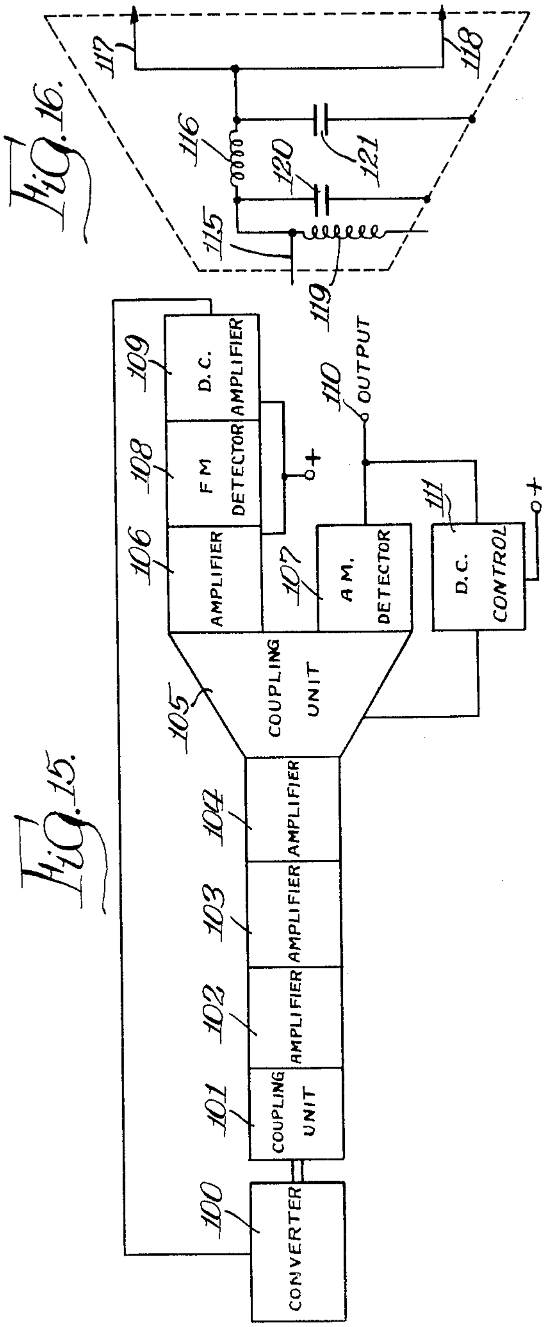
Figure 10:
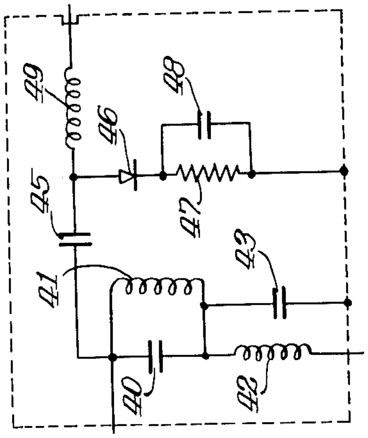
Figure 14:
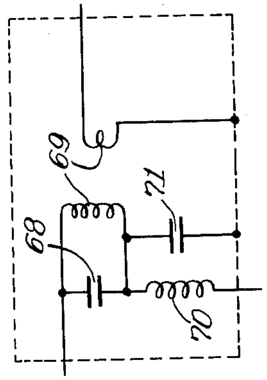
Figure 8:
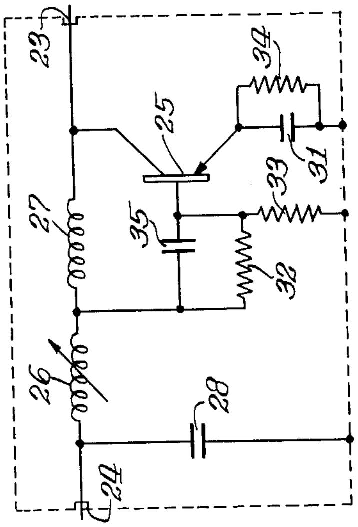
Figure 13:
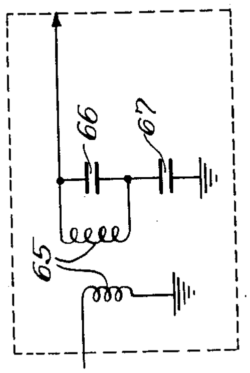
Figure 7:
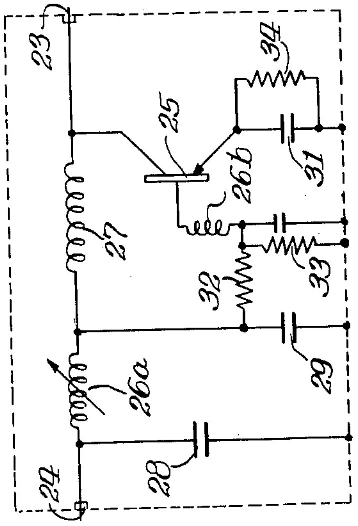
Figure 11:
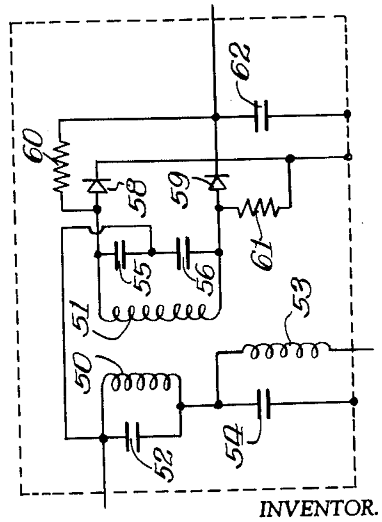

FIGS. 7, 8, and 9 are representative circuits of amplifier units;

FIGS. 10 and 11 are representative circuits of detector units;

FIG. 12 illustrates a filter circuit which may be provided as a module;

FIGS. 13 and 14 are circuits of terminating units;

FIG. 15 illustrates a second system formed of units in accordance with the invention; and FIG. 16 illustrates the circuit of the branch coupling unit of FIG. 15.

In accordance with the invention, standardized units are provided which may be used in various different equipments, and which are interconnected in various ways to provide the characteristics required in the different equipments. The units are constructed in a conducting housing which mechanically and electrically shields the components therein. The housing may be of cylindrical form with threaded ends to facilitate mechanical interconnection of a plurality of units. Units of other than cylindrical shape may be used, and other connecting means than threads may also be used. The components are sealed within the housings to form a module having fixed characteristics. Transistors may be used as the active elements in the modules, so that a small module is provided which can be completely sealed. The components are connected in a circuit so that a minimum of interconnections between units are required, as the signal and energizing currents are applied through the same connector. The shield is used as the ground or reference potential and a fixed interconnector may form the only additional component required. If desired, however, additional connections can be provided between the units and may be in the form of concentric rings in units formed as cylinders. Units forming amplifier and detector stages, filters, and coupling units may be provided. The coupling units permit connection to coaxial cables so the units may be placed as desired and easily interconnected.

Figures 1, 2, 3, 4, 5:
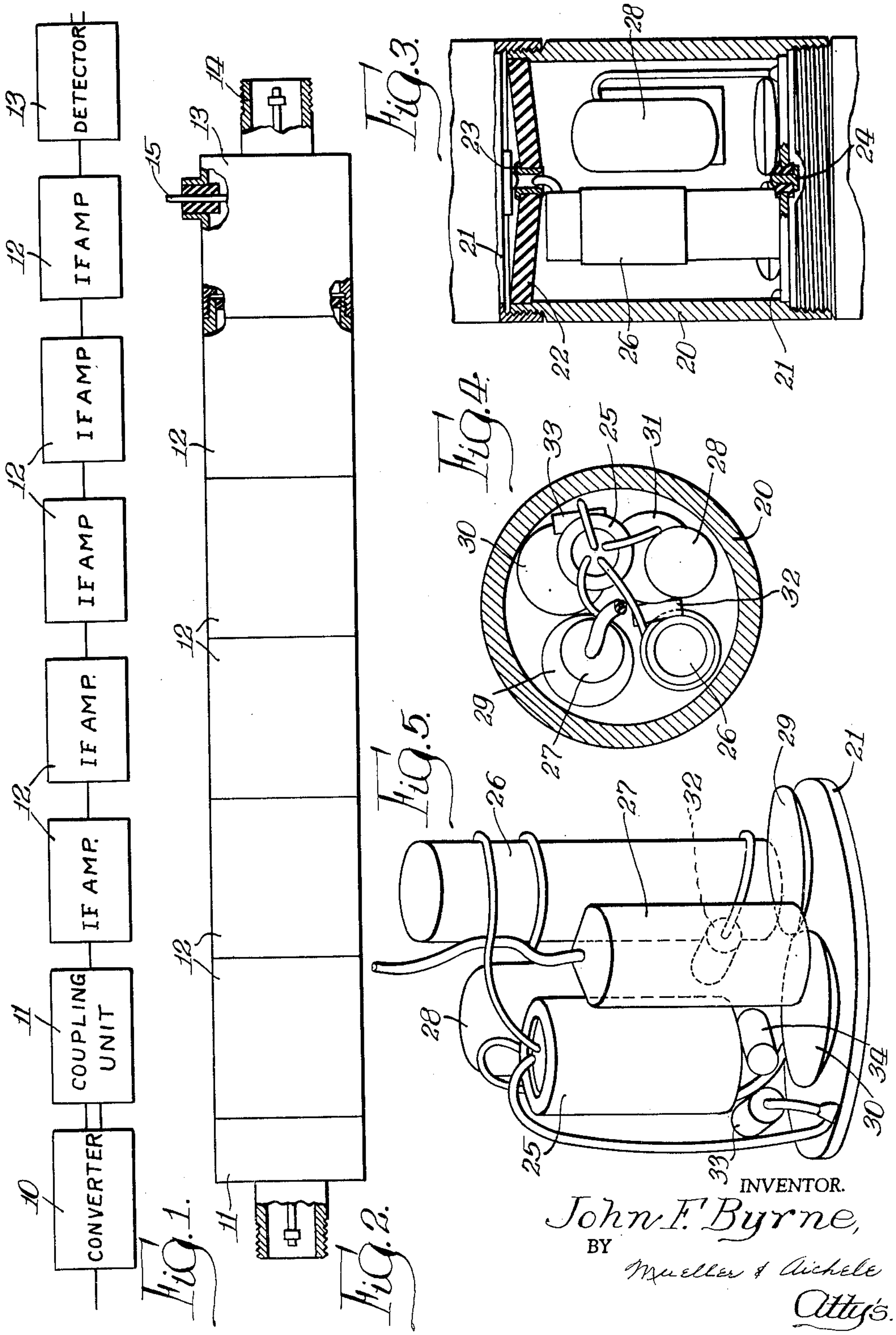
FIG. 1 is a block diagram illustrating a system including the preassembled units of the invention.
FIG. 2 shows a plurality of interconnected units.
FIGS. 3 and 4 are cross-sectional views illustrating one unit.
FIG. 5 is a perspective view showing the position of the components within a unit.

Referring now to the drawings, in FIG. 1 there is shown in block diagram form a system which may be a radio receiver. This includes converter 10 which may convert received radio frequency signals to a lower intermediate frequency, a coupling unit 11, five intermediate frequency amplifier stages 12, and detector 13. The coupling unit 10, intermediate frequency amplifiers 12, and detector 13 may be constructed in accordance with the invention, and the physical form of these elements is shown in FIG. 2. The converter is representative of various different input systems and may include a coaxial cable termination which is adapted to be coupled to the coaxial cable coupling of the coupling unit 11. The coupling unit, intermediate frequency amplifier units, and detector are interconnected in a manner which will be fully explained. The detector 13 includes a coaxial cable coupler 14 through which the output signal is applied to other units, and also a feedthrough 15 through which energizing potential is applied to the system.

FIGS. 3, 4, and 5 show in detail the construction of an amplifier module or unit. The module includes a tubular outer housing 20 which is formed of a conducting material such as copper, brass, aluminum, nickel, Monel metal, or stainless steel. A conducting plate 21 is provided at one end of the tubular housing and serves as the mounting plate for the components thereon. The other end of the housing is closed by insulating plate 22, and the two end plates and the tubular housing may be completely sealed to provide a completely sealed module, the characteristics of which remain fixed. The housing in addition to enclosing the elements also forms an effective electric shield therefor. Although one end plate is shown insulating, as it will be placed closely adjacent the conducting end plate 21 of the next unit, the unit is effectively shielded. Alternatively, the plate 22 may be made of conducting material provided with an insulated central terminal so that each unit is shielded independently of the other units.

Connections are provided on the end plates as illustrated by the center connector 23 in the insulating plate 22, and the center connector 24 on the conducting end plate 21. The connector 24 is insulated from the plate 22 as shown. The tubular housing 20 is threaded at each end so that a plurality of housings may be screwed together. The units are both mechanically and electrically interconnected through the threaded coupling, with the housing forming the reference or ground potential for the system and the signal connection being provided through the center conductor. The center conductors are brought together automatically when the units are screwed together.

The components which are provided within the housing will depend on the purpose for which the unit is used. An amplifier unit has been illustrated in FIGS. 3 to 5. It will be obvious, however, that detector units such as provided by the circuits of FIGS. 10 and 11, filter units as shown in FIG. 12, and other electrical sections can be used. The cylindrical housings may have different lengths, if required, for different units. For mechanical convenience, however, the same diameter and threaded connection is retained.

In the structures shown in FIGS. 3, 4, and 5, the main elements are transistor 25, coil 26, choke 27, and capacitor 28. These four elements are positioned in the cylindrical unit so that a minimum space is required. In addition to these units, capacitors 29, 30, and 31 and resistors 32, 33, and 34 are provided. These small units may be positioned in the housing in any available space. As previously stated, different units may be provided to perform various functions in an electrical system and, therefore, it is apparent that different components may be required in these units. As previously stated, the housing may provide ground, and condensers 29, 30, and 31 which are connected to ground may have one terminal connected directly to the plate 21. This makes for reduced over-all size and also facilitates construction of the unit.

Figure 6:
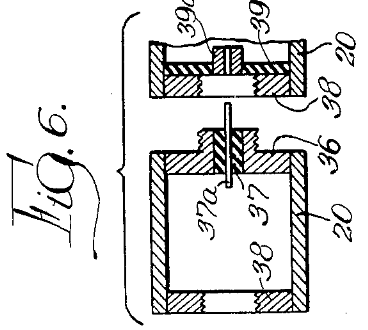
FIG. 6 illustrates a second embodiment of a housing for a module in accordance with the invention.

In FIG. 6, there is illustrated a second embodiment of the housing which may be used for the module. This includes the cylindrical housing portion 20 as in FIG. 3 with conducting end plates 36 and 38 secured thereto. The plate 36 has a threaded annular projection which is received in the tapped end plate 38. The insulator 37 is provided in the end plate 36 through which the conducting pin 37*a* extends. Adjacent the end plate 38 is an insulator 39 having a conducting socket 39*a* attached to receive the conducting pin 37*a*. Modules have been constructed as shown in FIG. 6 having an outside diameter of ⅝" and a length of ⅝". The housing as shown in FIG. 6 may be easily constructed and permits quick assembly of a plurality of modules which when interconnected form a rigid structure.

FIG. 7 is the circuit of an amplifier stage which may be provided in a module and the same numbers are applied to the parts as in FIGS. 3 to 5. Capacitor 28 and coil or inductor 26*a* form a tuned input circuit to which the signals are applied. This circuit may be considered as the output circuit of the preceding stage. The coil 26*a* is one coil section of the unit 26 and is mutually coupled to the coil section 26*b* which is part of the same unit. The voltage developed across coil 26*a* is applied to the base or input of the transistor. Capacitors 29, 30, and 31 provide bypass, and resistors 32, 33, and 34 provide bias potentials to the electrodes. The choke 27 completes the direct current energizing circuit through the unit. It will be seen that the transistor 25 is connected in a common emitter circuit and that direct current operating potential is applied to the collector electrode from terminal 23. Bias potential for the emitter electrode is provided and controlled by resistor 34 bypassed by capacitor 31. Operating bias for the base electrode is provided by the divider formed by resistors 32 and 33. The signal is applied to the base electrode, being received from terminal 24 and selected by the tuned input circuit. The output signal is applied from the collector electrode and appears at terminal 23. The direct current energizing potential may be applied either from terminal 24 or terminal 23, with choke 27 and coil 26*a* presenting negligible impedance to the direct current applied. Accordingly, the direct current may be applied through the system from one unit to the next.

The circuit of FIG. 8 is generally similar to that of FIG. 7, but includes a single coil 26 which resonates with the capacitor 28, and the base to emitter capacitance of the transistor, to provide a tuned input circuit. The signal from the coil 26 is applied through blocking capacitor 35 to the base electrode of transistor 25. The divider formed by resistors 32 and 33 provides the required bias for the base electrode as previously described. The emitter electrode is biased by resistor 33 which is bypassed by capacitor 31. This is identical to the circuit of FIG. 6. The radio frequency choke 27 completes the direct current path through the unit.

FIG. 9 illustrates an amplifier circuit generally similar to the amplifiers shown in FIGS. 7 and 8 but in which the stages are energized in series rather than in parallel. Two interconnected stages and the terminations therefor are shown in FIG. 9, with the individual modules being separated by dotted lines. Input signals are applied to the input coupling unit 75 through transformer 76. The secondary of the transformer 76 is tuned by capacitor 77 and signals therefrom are applied to the amplifier stage 80. The input circuit of amplifier 80 is tuned by inductor 81 and capacitor 82, with inductor 81 being inductively coupled to inductor 82 which applies the input signals to the base electrode of the transistor 83. The capacitor 84 completes this circuit. The transistor 83 is connected in a common emitter circuit, with the emitter being grounded through capacitor 85. The output is taken from the collector of transistor 83 and applied to the next stage. Resistors 86, 87, and 88 provide the direct current potentials as will be further described. The amplifier stage 90 may be identical to the amplifier stage 80 and the same reference numerals are applied to corresponding parts. The output from the amplifier 90 is applied to the output coupling unit 91, being applied through transformer 92 the primary of which is tuned by capacitor 93. The secondary of the transformer is coupled to the output terminal for utilizing the signal in a desired manner.

Considering now the direct current energizing circuit for the amplifier of FIG. 9, it will be noted that the stages are energized in series. The direct current potential is applied through choke 78 to the secondary of transformer 76, with capacitor 79 providing high frequency bypass. The direct current path continues through coil 81 and resistors 87 and 86 of stage 80, and through the corresponding elements of stage 90, to the output coupling unit, being applied through the primary of transformer 92 to ground. A positive potential is applied to the choke 78 and is divided by the various series elements. Resistors 88 provide bias to the emitter electrodes of the transistors of the stages 80 and 90.

The series circuit as shown in FIG. 9 may also be energized by a negative potential. In this case, the lower terminals of the secondary winding of transformer 76 and of capacitor 77 are grounded, and the negative potential is applied by a suitable choke and bypass capacitor to the lower terminals of capacitor 93 and of the primary winding of transformer 92. Accordingly, this series energizing circuit lends itself to the use of either negative or positive operating potentials. This circuit may be preferable when a large direct current potential is available, as less current is drawn from the power supply.

The sectionalization of the amplifier stages shown in FIGS. 7, 8, and 9 is a preferred, but not totally necessary arrangement. In the preferred arrangement shown, the input circuit of the transistor is tuned and the output or collector terminal is tuned by the next module which forms the load, whether a demodulator, amplifier, filter, or other element. It has been found that this arrangement is less susceptible to variation in transistor characteristics, for the collector to emitter or output capacitance is less variable than the input or base to emitter capacitance. In an alternate sectionalization (not shown) an output circuit for the transistor would be included in the module and arranged to drive the following transistor input or other circuit in the next module.

In the design of an amplifier, in order to provide a unit which is stable under all operating conditions, the backward loss of the unit must be greater than the forward gain thereof at all frequencies which may be involved. This is necessary to prevent oscillations in the amplifier circuit, and when met, it is possible to cascade any number of amplifiers, without encountering undesirable oscillations. Adequate shielding is provided by the housing so that the unit may be used with any other equipment without objectionable interference.

In FIG. 10 there is shown an amplitude modulation detector circuit which may be incorporated in a module unit as previously described. This unit includes capacitor 40 and inductor 41 which form the output circuit of the preceding stage. Direct current energizing potential may be applied through choke 42 which is bypassed by condenser 43. This energy will flow through coil 41 down through the stages to energize the transistors in each stage. The output of the tuned circuit is coupled through capacitor 45 to semiconductor diode 46, connected in series with load impedance 47. The load impedance is shown as a resistor 47 shunted by capacitor 48 which bypasses the radio frequency signals. The resulting audio signals are applied through choke 49 to the output terminal of the unit. This may be a unit as shown at 13 in FIG. 2 having a coaxial cable or other connector 14 for the output signals and a feedthrough 15 for the direct current energizing signals.

FIG. 11 illustrates a frequency modulation detector which may be provided in a module for direct connection to an intermediate frequency stage. This includes tuned and coupled discriminator coils 50 and 51, the coil 50 being tuned by capacitor 52. Energizing potential for the preceding amplifier stages may be applied through choke 53 which is bypassed by capacitor 54. The discriminator coil 51 is tuned by capacitors 55 and 56 having a common connection to which signals from the output circuit are fed. A pair of diodes 58 and 59 rectify the voltages produced by the discriminator network and the output signals are developed across load resistors 60 and 61 and appear across output capacitor 62. This output may be applied to a coaxial cable or other connector as indicated at 14 in FIG. 2, and the energizing potential may be applied through a feedthrough as indicated at 15 in FIG. 2.

FIG. 12 illustrates a filter circuit which may be used in various places in an electrical system. For example, such a filter may be used with an amplifier to provide a desired bandpass characteristic. The filter includes a transformer 95 having the primary tuned by capacitor 96 and the secondary tuned by capacitor 97. The transformer windings are isolated from the housing by the capacitor 98 so that energizing potential may be applied through the filter if desired. It is to be pointed out that multiple section filters may be used to provide any desired characteristics, and that the circuit shown is merely representative of circuits which may be used.

As previously stated, the modules in accordance with the invention may include coupling units for connection to coaxial lines. A signal input coupling unit is shown in FIG. 13, which may be the unit 11 of FIG. 2. The signals are applied through coupling transformer 65 which is tuned by capacitor 66. The circuit is isolated from ground by capacitor 67. The output signal may be applied to a center terminal such as terminal 23 of FIG. 3 or conductor **37*a*** of FIG. 6 for connection to the input terminal of the first amplifier stage.

In the event that it is not desired to connect a detector to the output of the amplifier sections, an output coupling unit as shown in FIG. 14 may be used. This includes an output resonant circuit formed by capacitor 68 and the primary winding of transformer 69. Energizing potential is applied to the amplifier system through choke 70 which is bypassed by capacitor 71. The output signal obtained from the secondary winding of transformer 69 may be applied to a coaxial coupling such as 14 of FIG. 2. The direct current energizing potential may be applied to choke 70 through a feedthrough connector as illustrated at 15 in FIG. 2.

In FIG. 15 there is shown in outline form a further system which may be formed by modules in accordance with the invention. This system includes a converter 100 which may reduce the frequency of received signals to an intermediate frequency. This is followed by a coupling unit 101 and amplifiers 102, 103, and 104 which may be provided as modules as previously explained. The output of the amplifier 104 is applied to the coupling unit 105 which divides the signal between the amplifier 106 and the amplitude modulation detector 107. This coupling unit may be provided in a housing for connection to the module 104 and have receptacles for connection thereto of the modules 106 and 107. Coupled to the amplifier 106 is a frequency modulation detector 108 and a direct current amplifier 109 which may also be provided as modules. The amplitude modulation detector provides an output signal at terminal 110, which signal may also be applied to the direct current control stage 111.

Considering now the operation of the system of FIG. 15, this may serve as an amplitude modulation receiver with the radio frequency signals being applied from an antenna to the converter 100 and through the amplifiers to the detector 107 which derives the modulation signal and provides an output. The frequency modulation detector 108 produces a control signal varying with the frequency of the received wave which is amplified in the direct current amplifier 109 and applied to the converter 100. This operates to change the frequency of the heterodyne signal in the converter so that the converter is properly tuned. The output of the amplitude modulation detector operates through the control unit 111 to control the direct current applied which energizes the amplifiers 102, 103, and 104. This direct current is indicated as applied to coupling unit 105, but may alternately be applied to control unit 101. This controls the gain of the amplifiers to effectively provide automatic volume control for the receiver.

The system of FIG. 15 is provided to illustrate that the modules may be connected in various circuits, with outputs being taken off at different points and used for various purposes. It will be apparent that many other arrangements than the systems illustrated in FIGS. 1 and 15 may be provided by use of the modules in accordance with the invention.

In FIG. 16 there is illustrated the circuit which may be used in the coupling unit 105 of FIG. 15. The input signal to the coupling unit is applied on conductor 115 and through coil 116 to the conductors 117 and 118 which provide two outputs. Energizing potential for the preceding stages, or succeeding stages, may be applied through choke 119. In FIG. 15 the amplifiers 102, 103, 104, and 106 may all be energized from this coupling unit. Capacitors 120 and 121, together with coil 116, form a network which matches the output impedance of the preceding stage to the input impedance of the succeeding stages. Such a coupling may provide a two-to-one impedance transformation by properly selecting the value of capacitor 121 so that it is larger than the value of capacitor 120.

It will be apparent that modules constructed in accordance with the invention may be used for other units such as other types of amplifiers, filters of various types, etc. The units can be impregnated and completely sealed, if desired, to thereby preserve the electrical characteristics in the presence of rough usage, vibration, humidity, and other adverse conditions.

The gain of the amplifiers can be controlled by controlling the level of the direct current potential applied thereto. Detectors of a standard construction can be utilized for providing a voltage which is a measure of the level of the signals in the system. Amplifiers may be used if required to bring such control signals to the required level for effectively controlling the gain of the stages.

In the circuits shown, only a single terminal is required for each unit in addition to the energizing connection provided through the housings. While this simplifies the construction, it will be apparent that additional connections between units may be provided in some cases. This may be accomplished by the use of concentric annular terminals engaged by annular spring fingers. This would still permit the convenient attachment and detachment of units which have threaded connections as illustrated in FIGS. 3 and 6. It is to be pointed out, however, that other types of connections can be used and, if preferred, the units after being assembled can be soldered to provide a permanent electrical connection between units.

I claim:

1. A preassembled electronic unit including in combination, a tubular conducting housing which forms a reference potential, a plurality of electronic components within said housing, said housing being rigid and supporting and shielding said components therein, means connecting said components in a circuit with said circuit being connected to said housing, and conductor means within said housing connected to said circuit and having a portion positioned at an end of said tubular housing and insulated therefrom for connecting the unit to complementary conductor means of another unit, said housing including connector means for electrically connecting said housing to the housing of another unit, and for providing a rigid physical connection between said housing and the housing of such other unit, whereby the interconnected housings form a continuous shield for the interconnected circuits and conductor means therein.

2. An electronic unit as defined in claim 1 wherein said electronic components and said circuit provide a detector for deriving modulation components from a carrier wave.

3. An electronic unit as defined in claim 1 wherein said electronic components and said circuit provide a filter for selecting predetermined frequencies.

4. An electronic unit as defined in claim 1 wherein said electronic components and said circuit provide a coupling circuit for connection to another unit.

5. Electronic apparatus including in combination, a plurality of preassembled units interconnected in cascade, each of said units having a rigid tubular conducting housing which forms a reference potential, a plurality of electronic components within each housing and supported and shielded thereby, means connecting the components in each housing in a circuit with the circuit being connected to said housing, said housings including connector means for physically and electrically connecting said housings of a plurality of units into a rigid assembly having a continuous electrically conducting tubular housing, and conductor means positioned at an end of said tubular housing and connected to the circuit therein for connection to conductor means of the unit connected thereto, said conductor means including a single conductor supplying energizing potential and signals to the unit.

6. A preassembled electronic unit including in combination, a conducting housing which forms a reference potential, a plurality of electronic components within said housing including a transistor device, means connecting said components in an amplifier circuit with said circuit being connected to said housing, said housing including a tubular outer member and end members which effectively shield the components therein, and conductor means connected to said circuit and positioned at an end of said tubular housing for connecting the unit to complementary conductor means of another unit, said conductor means including a single conductor supplying energizing potential and signals to the unit, said housing including connector means for physically and electrically connecting said housing to the housing of another unit.

7. A preassembled electronic unit including in combination, a rigid cylindrical conducting housing which forms a reference potential, a plurality of electronic components within said housing and supported and electrically shielded thereby, means connecting said components in a circuit with said circuit being connected to said housing, and conductor means connected to said circuit and positioned at the center of an end of said tubular housing for connecting the unit to complementary conductor means of another unit, said cylindrical housing including a threaded portion for interconnection with a complementary threaded portion of the housing of another unit for providing a rigid physical connection of the housing with the housing of another unit and forming a continuous electrical shield extending from said housing to the housing of such other unit.

8. A preassembled electronic unit including in combination, a rigid conducting housing which forms a reference potential, a plurality of electronic components within said housing and supported and electrically shielded thereby, means connecting said components in a circuit with said circuit being connected to said housing, said housing including a threaded input portion and a plurality of threaded output portions for interconnection with complementary threaded portions of the housings of other units, for physically and electrically interconnecting a plurality of units, and conductor means connected to said circuit and positioned at the center of each of said threaded portions for connection to complementary conductor means of said other units.

9. A preassembled electronic unit including in combination, a rigid cylindrical conducting housing which forms a reference potential, a plurality of electronic components within said housing including an active amplifying device, means connecting said components in an amplifying circuit with said circuit being connected to said housing, said housing shielding said amplifying circuit to render the same stable, and terminal means connected to said circuit and positioned at the center of one end of said tubular housing for connecting the unit to complementary conductor means of another unit, said cylindrical housing including threaded end portions for connection to the housings of other units for physically and electrically interconnecting a plurality of units, said terminal means applying energizing currents to said amplifying device and coupling signal currents between interconnected units.

10. A preassembled electronic unit including in combination, a rigid cylindrical conducting housing which forms a reference potential, a plurality of electronic components within said housing and supported and shielded thereby, means connecting said components in a detector circuit with said circuit providing detected signals with respect to said housing, and conductor means connected to said circuit and positioned at the center of an end of said tubular housing for connecting the unit to complementary conductor means of another unit, said cylindrical housing including a threaded portion for connection to the housing of another unit for physically and electrically interconnecting a plurality of units.

11. A preassembled electronic unit including in combination, a rigid cylindrical conducting housing which forms a reference potential, a plurality of electronic components within said housing and supported and shielded thereby, means connecting said components in a filter circuit with said circuit providing selected signals with respect to said housing, and conductor means connected to said circuit and positioned at the center of an end of said tubular housing for connecting the unit to complementary conductor means of another unit, said cylindrical housing including a threaded portion for connection to the housing of another unit for physically and electrically interconnecting a plurality of units.

12. A preassembled electronic unit including in combination, a rigid cylindrical conducting housing which forms a reference potential, said cylindrical housing including a threaded portion for connection to the housing of another unit for physically and electrically interconnecting a plurality of units, a plurality of electronic components within said housing and supported and shielded thereby, means connecting said components in a coupling circuit, first conductor means connected to said circuit and positioned at the center of an end of said tubular housing for applying signals from the unit to complementary conductor means of another unit, and second conductor means extending through said housing for applying an energizing potential to said circuit.

13. A preassembled electronic unit including in combination, a tubular conducting housing which forms a reference potential, a plurality of electronic components within said housing including a transistor device, means connecting said components in a circuit with said circuit being connected to said housing, and conductor means connected to said circuit and positioned at one end of said tubular housing for connecting the unit to complementary conductor means of another unit, said conductor means including a single conductor for applying energizing potential to said transistor device and for coupling signals to said circuit, said housing including connector means for physically and electrically connecting said housing to the housing of another unit.

14. Electronic apparatus including in combination, a plurality of preassembled units interconnected in cascade, each of said units having a tubular conducting housing which forms a reference potential, said housings each including connector means for physically and electrically connecting said housings to form a rigid assembly, a plurality of electronic components within each housing including a transistor device, means connecting said components in each housing in an amplifier circuit with said circuit being connected to said housing, and conductor means positioned at the ends of each tubular housing and connected to said circuit thereof for connection to complementary conductor means of the connected units, said conductor means including a single conductor for applying energizing potential to said transistor device and for coupling signals to said circuit.

15. Apparatus in accordance with claim 14 wherein said amplifier circuits of adjacent units are energized in parallel through said conductor means.

16. Apparatus in accordance with claim 14 wherein said amplifier circuits of adjacent units are energized in series through said conductor means.

References Cited in the file of this patent

UNITED STATES PATENTS

| | | |
|---|---|---|
| 2,560,320 | Winkler | July 10, 1951 |
| 2,703,853 | Chrystie | Mar. 8, 1955 |

FOREIGN PATENTS

| | | |
|---|---|---|
| 454,776 | Great Britain | Oct. 7, 1936 |

OTHER REFERENCES

Pub. 3, Unitized Component Design, Radio Electronics Engineering, vol. 48, July 1952, pp. 14 to 16 and 28.

Radio-Craft, January 1939, "Make This Plug-Together 8-Tube A.C. Receiver," pp. 400, 401, 431.

Proceedings of the IRE, September 1944 "Unitized Radio Chassis Design," pp. 521–525.